United States Patent [19]
Booth

[11] 3,857,895
[45] Dec. 31, 1974

[54] RECOVERY OF CATALYST COMPLEXES
[75] Inventor: Frank B. Booth, Placentia, Calif.
[73] Assignee: Union Oil Company of California, Los Angeles, Calif.
[22] Filed: May 12, 1969
[21] Appl. No.: 823,995

[52] U.S. Cl. .......... 260/604 HF, 260/598, 260/599, 260/617 HF, 260/632 HF, 260/618 R
[51] Int. Cl. ............................................ C07c 45/08
[58] Field of Search ............ 260/604 HF, 598, 599, 617 HF, 260/618 R, 632 HF

[56] References Cited
FOREIGN PATENTS OR APPLICATIONS
988,941  4/1965  Great Britain ................ 260/604 HF
1,290,535  3/1969  Germany ...................... 260/604 HF Primary Examiner—Leon Zitver
Assistant Examiner—R. H. Liles
Attorney, Agent, or Firm—Richard C. Hartman; Dean Sandford; Michael H. Laird

[57] ABSTRACT

A method is described for the use of complexes of Group VIII metals and amino hydrocarbyl ligands as catalysts for the hydroformylation of olefins and the recovery of the complexes from high boiling residues fromed in the hydroformylation. A catalyst complex is recovered in accordance with the teachings by treatment of the organic solvent with an aqueous acid which is effective to extract the catalyst complex from the organic phase into the aqueous acid extract phase. The metal complex can be precipitated from the acid extract phase into a hydrocarbon solvent by neutralization of the acid with a base.

13 Claims, No Drawings

RECOVERY OF CATALYST COMPLEXES

DESCRIPTION OF THE INVENTION

The invention relates to a method for catalytic hydroformylation and to the recovery of Group VIII metal catalysts from the reaction solvents. The invention further relates to the recovery of the complexes of Group VIII metals with trihydrocarbyl ligands from nonpolar organic solvents and, in a specific embodiment, relates to the treatment of a portion of the reaction medium used in the hydroformylation of olefins to carbonyls to recover the catalyst therefrom prior to discard of a portion of the reaction medium containing the tarry and high boiling byproducts formed during the reaction.

Recent advances in homogeneous catalysis have included the preparation and use of soluble complexes of Group VIII metals, and biphyllic ligands such as the trihydrocarbyl phosphines, stibines, arsines and bismuthines. These complexes are useful for a variety of reactions such as hydrogenation of carbonyls, olefins, aromatics, etc.; hydroformylation of olefins to carbonyls and alcohols and the hydrocarboxylation of olefins to carboxylic acids. Processes based on the use of these homogeneous catalysts unavoidably encounter the formation of high boiling byproducts of the reaction, e.g., tars and high boiling aldol condensation products in hydroformylation or hydrogenation of carbonyls. The commercial adoption of the aforementioned hydroformylation requires the removal and discard of a portion of the reaction medium to avoid excessive accumulation of the high boiling products; however, the expense of the catalyst and associated ligand prohibits its discard. Accordingly, it is desirable that a method be devised for the economical recovery of the homogeneous Group VIII metal-trihydrocarbyl ligand complexes. Such a method is particularly needed in combination with the Group VIII noble metal catalysis where the high cost of the noble metal necessitates almost complete recovery of the catalyst prior to discarding of the high boiling and tarry constituents.

It is an object of this invention to provide a method for the recovery of Group VIII metal values from nonpolar organic solvents.

It is also an object of this invention to provide catalyst complexes with amino- or amidino-hydrocarbyl ligands which can be easily separated from organic solvents.

It is a further object of this invention to provide a method for the recovery of Group VIII metal complexes of such ligands.

It is a further object of this invention to provide a method for the recovery of complexes of Group VIII metals and such in combination with hydrogenation or hydroformylation reactions.

It is an additional object of this invention to provide a method for the recovery of Group VIII metal complexes of such ligands from polar solvents containing tars and high boiling byproducts.

It is a further object of this invention to provide a method for the recovery of the catalyst values as a step in a comprehensive method to remove tar and high boiling byproducts from a hydroformylation reaction using certain Group VIII metal-amino-hydrocarbyl ligand cmplexes.

Other and related objects will be apparent from the following description of the invention.

I have now found that a Group VIII metal can be substantially completely recovered from an organic nonpolar solvent or from a hydroformylation reaction residue by complexing the Group VIII metal with an amino- or amidino- hydrocarbyl ligand and then extracting the residue with an acid. The extraction can be performed at ambient conditions including temperatures from about 0° to about 125°C. and pressures from about 1 to 1000 atmospheres, sufficient at the extraction temperature to maintain liquid phase conditions during the extraction step. The metal complex can thereafter be recovered from the acid phase by neutralization of the acid which precipitates the metal-ligand complex from the acid phase. Preferably the dilution is performed in the presence of a nonpolar solvent which dissolves the complex.

The amidino- or amino hydrocarbyl ligand complex with the Group VIII metal apparently functions as a strong base and forms ammonium salt when contacted by the acid during extraction. The salt is highly soluble in the acidic extract phase and insoluble in nonpolar media so that essentially complete extraction can be achieved. The catalyst is frequently used in reaction media in the presence of excess ligand and the aqueous acid also extracts any excess ligand that is present in the nonpolar media subjected to treatment. The metal complex and excess ligand can be recovered from the aqueous acid simply by neutralization of the acid or by dilution of the acid with water.

The extraction can be performed on a hydrocarbon solution of the Group VIII metal amidino- or aminohydrocarbyl ligand complex in any of the hydrocarbon solvents hereafter mentioned. The invention thus employed serves as a purification step for the complex. The most useful application of the invention is for the selective extraction of Group VIII metal-ligand complexes from hydroformylation residues containing high boiling residues and byproducts. Of particular value is the application to recovery of the Group VIII noble metal catalyst values from such residues because of the high value of such metal values.

The process of hydrocarbonylation wherein my invention affords the greatest value is that described in copending application Ser. Nos. 518,562 and 642,191. The process comprises contacting an olefin, carbon monoxide and hydrogen with a liquid reaction medium containing a homogeneous catalyst at temperatures from about 20° to about 300°C. and pressures from 1 to about 1,000 atmospheres. In the first of the aforementioned applications the catalyst described is a Group VIII noble metal halide complex with carbon monoxide and a biphyllic ligand. Also included in the reaction medium is a cocatalyst comprising a polycyclic, heterocyclic, saturated amine having at least one nitrogen in a bridgehead position. In the other application aforementioned, the catalyst described is a Group VIII noble metal hydride complex with carbon monoxide and a biphyllic ligand.

The biphyllic ligands are organic compounds capable of forming a complex with the catalyst by coordinate covalent bonding and have one atom with an unshared pair of electrons for such bonding. These can be organic compounds of trivalent phosphorus, antimony, arsenic and bismuth.

As used in this invention, the biphyllic ligand is modified to incorporate a basic nitrogen group on the hydrocarbyl radical of the ligand. Accordingly, amino or amidino groups can be substituted on the aromatic or alkyl group attached to the trivalent phosphorus, arsenic, antimony or bismuth atom. When treated with the aqueous acid such groups convert to ammonium or amidinium salts and are dissolved in the aqueous acid phase.

During hydroformylation there occurs a slight but continuous accumulation of high boiling byproducts and tar which remain in the bottoms from the distillation zone used to recover the products. These are recycled to the reaction zone with the bottoms stream which also contains the catalyst. In accordance with my invention all or a portion of this liquid residue fraction is contacted with an aqueous acid solution which is effective in the selective extraction of the catalyst from the liquid residue. The extract phase resulting from this contacting is separated from the liquid residue which contains the tar and high boiling byproducts and which can be discarded or otherwise processed.

The extract phase can thereafter be treated to recover the catalyst for returning to the reaction zone and this can simply be effected by precipitation of the catalyst by dilution or neutralization of the extract phase. Surprisingly, I have found that this treatment effects substantially complete recovery of the catalyst from the reaction medium prior to its discarding. Complete recovery of the catalyst from the acidic extract phase can be achieved. The treatment does not destroy the complex catalyst composition or impair its activity when it is subsequently employed in the hydrocarbonylation reaction.

Acids having sufficient strength to form ammonium or amidinium salts with the basic nitrogen groups of the ligand can be used. Examples of such include the mineral acids such as hydrohalic acids, e.g., hydrochloric, hydrobromic, hydroiodic, hydrofluoric acids, sulfuric, nitric or phosphoric. Examples of organic acids include the alkane and aromatic sulfonic acids having from 1 to about 9 carbons, e.g., methanesulfonic, ethanesulfonic, butanesulfonic, benzenesulfonic, toluenesulfonic, xylenesulfonic, cumenesulfonic, heptanesulfonic acids, etc.

The acid should be present in the extract phase at a sufficient concentration to effect the extraction. This concentration is generally 5 weight percent or greater. The particular acid and its concentration can readily be selected by admixing an aqueous solution of the acid under investigation for use as an extractant with a toluene or other hydrocarbon solution containing dissolved quantities of the metal complex. Solutions of the metal complexes are colored and the decoloring of the toluene solution can be observed as the criterion for determination of the acid strength, i.e., the acid solution should be of sufficient concentration so that when admixed with a toluene solution of the metal complex, the acid solution will decolor the toluene solution. As previously mentioned, such acid concentrations are about 5 to 100 weight percent.

The invention is particularly applied to a process for the hydroformylation of olefins using a catalyst comprising a Group VIII metal complexed with an amino- or amidino- hydrocarbyl ligand.

The hydrocarbon olefin useful in such a hydroformylation can be any ethylenically unsaturated hydrocarbon having from 2 to about 25 carbons, preferably from 2 to about 15 carbons. The ethylenically unsaturated compound has the following general structure:

$$R_2R_1C=CR_3R_4$$

wherein $R_1$, $R_2$, $R_3$ and $R_4$ are hydrogen or the same or different alkyl, cycloalkyl, aryl, or wherein one of said $R_1$ and $R_2$ and one of said $R_3$ and $R_4$ together form a single alkylene group having from 2 to about 8 carbons.

Examples of useful ethylenically unsaturated hydrocarbons are ethylene, propylene, butene-1, butene-2, 2-methylbutene-1, cyclobutene, hexene-1, hexene-2, cyclohexene, 3-ethylhexene-1, isobutylene, octene-1, 2-methylhexene-1, ethylcyclohexene, decene-1, cycloheptene, cyclooctene, cyclononene, 3,3'-dimethylnonene-1, dodecene-1, undecene-3, 6-propyldecene-1, tetradecene-2, 3-amyldecene-1, oligomers of olefins such as propylene tetramer, ethylene trimer, etc., hexadecene-1, 4-ethyltridecene-1, octadecene-1, 5,5-dipropyldodecene-1, vinylcyclohexane, allylcyclohexane, styrene, p-methylstyrene, alpha-methylstyrene, p-vinylcumene, beta-vinylnaphthalene, 1,1-diphenylethylene, allylbenzene, 6-phenylhexene-1, 1,3-diphenylbutene-1, 3-benzylheptene-1, divinylbenzene, 1-allyl-3-vinylbenzene, alpha-vinylnaphthalene, etc. Of the preceding, alpha hydrocarbon olefins and olefins having 2 to about 8 carbons are most preferred, e.g., ethylene, propylene, butene-1, hexene-1, heptene-1, octene-1, etc.

The Group VIII metal can be present in the aforementioned hydroformylation reaction as a metal hydride or salt, typically a halide, in complex association with carbon monoxide and an amino- or amidino- hydrocarbyl ligand. There can also be incorporated in the reaction solution a polycyclic, heterocyclic amine having a nitrogen in at least one bridgehead position. Examples of Group VIII metal hydrides, carbonyls or salts include those which are commercially available. Examples of suitable sources of the metal values are as follows: iridium carbonyl, iridium tetrabromide, iridium tribromide, iridium trifluoride, iridium trichloride, osmium trichloride, chloroosmic acid, palladium hydride, palladous chloride, palladous cyanide, palladous iodide, palladous nitrate, platinic acid, platinous iodide, palladium cyanide, sodium hexachloroplatinate, potassium trichloro(ethylene)platinate (II), chloropentaaminorhodium(III)chloride, rhodium dicarbonyl chloride dimer, rhodium nitrate, rhodium trichloride, ruthenium trichloride, tetraaminorutheniumhydroxychloro chloride, etc. Suitable salts of other Group VIII metals include cobalt chloride, ferric acetate, nickel fluoride, cobalt nitrate, etc., carboxylates of $C_2-C_{10}$ acids, e.g., cobalt acetate, cobalt octoage, etc., nickel sulfate, ferric nitrate, etc.

When the non-noble Group VIII metals are used, it is preferred to employ the allyl ligands hereafter discussed whereas the mono- and di- aryl ligands are preferred and triaryl ligands are most preferred with the noble Group VIII metals. Some differences in products are also observed depending on the metal; the non-noble metals catalyze simultaneous hydrogenation so that from 20 to 90 percent of the product is the alcohol whereas the noble metals selectively catalyze to the aldehyde product.

The catalyst is associated with an amidino- or amino-hydrocarbyl ligand. The ligand is a compound having at least one atom with a pair of electrons capable of forming a coordinate covalent bond with a metal atom and simultaneously having the ability to accept the electron from the metal, thereby imparting additional stability to the resulting complex. The ligand can comprise organic compounds having from 3 to about 25 carbons and containing arsenic, antimony, phosphorus or bismuth in a trivalent state with at least one amino or amidino group. Of these, the phosphorus compounds, i.e., the phosphines, are preferred; however, the phosphites, arsines, stibines and bismuthines can also be employed. In general, these biphyllic ligands have the following structure:

$R_mE$ wherein E is trivalent phosphorus, arsenic or antimony;

wherein R is the same or different alkyl, having 1 to about 10 carbons, examples of which are methyl, butyl, nonyl, etc.; cycloalkyl having from 5 to 10 carbons, e.g., cyclohexyl, methylcyclopentyl, cyclodecyl, etc.; aryl having from 6 to 10 carbons, e.g., phenyl, tolyl, xylyl, tetramethylphenyl, etc.; and wherein at least one of said R groups bears an amino- or amidino- group.

Preferably, the ligand is triaryl having at least one amino group.

Examples of suitable biphyllic ligands having the aforementioned structure and useful in my invention to stabilize the catalyst composition are the following: tri(aminomethyl)-phosphine, tri(amidinoethyl)arsine, tri(aminoethyl)stibene, tri(aminoisopropyl)stibene, dioctyl(aminocycloheptyl)phosphine, amidinodicyclohexylphosphine, amidinoethyldiisopropylstibene, tri(aminocyclohexyl)phosphine, amidomethyldiphenylphosphine, N,N-diethylaminomethyldiphenylstibine, tri-aminophenylphosphine, tris(N,N-dimethylphenyl)arsine, tri(N,N-diethylaminophenyl)phosphine, amidinophenyldiisopropylphosphine, amidinophenyldiamylphosphine, N,N-dipropylethyldiphenylphosphine, p-aminophenylditolylphosphine, aminopropyldiphenylarsine, aminoethyldi(m-xylyl)stibine, aminocyclopentyldixylylstibine, dioctylaminophenylphosphine, aminophenyldixylylphosphine, etc. Of the aforementioned, the aromatic containing phosphines and particularly the triaromatic phosphines are preferred with Group VIII noble metals because of their greater hydroformylation activity with the noble metal whereas the alkyl and particularly the trialkyl phosphines are preferred with Group VIII non-noble metals because of their greater hydroformylation activity with the non-noble metals.

The aforementioned ligands can be readily prepared by use of a Grignard reagent. In this reaction an amino or amidino alkylene, cycloalkylene or arylene bromide is reacted with magnesium to form the Grignard reagent which is then reacted with a phosphine, arsine or stibine halide, preferably a bromide. In this preparation, the alkylene, cycloalkylene and arylene have the aforementioned number of carbon atoms and suitable examples are aminoethyl bromide, amidinoisobutyl bromide, N,N-diethylaminopropyl bromide, N,N-dimethylaminophenyl bromide, amininomethylphenyl bromide, aminomethylcyclopentyl bromide, aminocyclohexyl bromide, etc. The Grignard is formed by reaction of magnesium with the aforementioned in the conventional manner, e.g., at a temperature of from 0°–100°C. The Grignard reagent is then slowly added to the phosphine halide while cooling to maintain a low temperature, e.g., about −100° to 0°C. The mixture is then gently warmed to a refluxing temperature using solvents having atmospheric boiling points of 100°C. or less. Examples of suitable phosphine, arsine or stibine halides are: dipropylchlorophosphine, diethylbromoarsine, di-n-butylbromophosphine, dicyclohexylbromophosphine, dicycloheptylbromostibine, octylethylchlorophosphine, di(methylcyclopentyl)bromophosphine, ditolylbromoarsine, diphenylbromophosphine, dixylylbromophosphine, di(butylphenyl)bromophosphine, isobutyldichlorophosphine, nonylidbromophosphine, isopropyldichlorostibine, cycloheptyldibromophosphine, cumenyldibromophosphine, arsenic trichloride, antimony tribromide, phosphorus tribromide, etc. When a monohalo compound is used, the reaction will provide a ligand having only one of the R groups bearing an amino or amidino group. When a dihalo compound is used, two R groups will bear the basic nitrogen group and when a trihalide is used, all three R groups will bear the basic nitrogen group.

The ligand can be recovered from the preparative solution by extraction into volatile organic solvents, e.g., ethers which can be evaporated to leave the crude product. Purification can be by acid extraction of the ligand using concentrated hydrochloric acid from which the ligand can be crystallized by dilution of the acid with water.

The Group VIII metal may be complexed with the above-described ligand before being introduced into the reaction medium or the complex may be formed "in situ" by simply adding a compound of the metal and the ligand directly into the reaction medium. In either case, it is generally preferable that the quantity of ligand be in excess (e.g., 10–300%) of that stoichiometrically required to form a complex with the Group VIII metal. The complex has from 1 to about 5 moles of ligand per atom of the metal and other components such as hydride, or soluble anions such as sulfate, nitrate, $C_1$–$C_5$ carboxylates (e.g., acetate, propionate, isobutyrate, valerate, etc.), halide, etc. may be but need not be included in the complex catalyst of this invention. These components may be incorporated in the catalyst by the formation of the catalyst complex from a Group VIII metal salt of the indicated anions.

A cocatalyst which can be employed with the Group VIII noble metal halide catalyst for the hydroformylation reaction is a poly(heterocyclic)amine having at least one nitrogen in a bridgehead position. The term "bridgehead position" is well established in chemical nomenclature to identify the position of an atom which is common to at least two of the rings of the polycyclic compound. Preferably the amine is an atom-bridged system, i.e., atoms, generally methylene carbons, form the bridge or link in the molecule rather than a simple valence bonding. The amine can be used also in catalytic amounts, e.g., from about 0.001 to about 10 weight percent; preferably from about 0.05 to 5 weight percent of the liquid reaction medium. In general, amines having from 1 to about 4 nitrogen atoms and from 1 to about 25 carbons; preferably from 2 to about 10 carbons; can be employed for this purpose and the following is a listing of representative amines useful in my invention: 1,2,4-triazabicyclo(1.1.1)pentane; 1,5,6-triazabicyclo(2.1.1)hexane; 5-oxa-1,6-diazabicyclo(2.1.1) hexane; 5-thia-1,6-diazabicyclo(2.1.)hexane; 2-oxa-1,5,6-triazabicyclo(2.1.1)hexane; 1,2,5,6-tetrazabicyclo(2.1.1)hexane; 5-oxa-1,2,3,6-tetrazabicyclo(2.1.1)hexane; 1-azabicyclo(3.3.1)heptane; 1-azabicyclo(2.2.1)heptane; 1,4-methano-1,1-pyrindine;

2-ox-1-azabicyclo(2.2.1)heptane; 1,4-diazabicyclo(2.2.1)heptane; 7-oxa-1-azabicyclo(2.2.1)heptane; 7-thia-1-azabicyclo(2.2.1)heptane; 1,7-diazabicyclo(2.2.1)heptane; 1,3,5-triazabicyclo(2.2.1)heptane; 1-azabicyclo(3.2.1)octane; 1,5-diazatricyclo(4.2.1)decane; 1,7-diazatricyclo(3.3.1.2)undecane; 7-ox-1-azabicyclo(3.2.1)octane; 1,7-diazabicyclo(3.2.1)octane; 3-thia-1,7-diazabicyclo(3.2.1)octane; 1,3,6,8-tetrazatricyclo(6.2.1)dodecane; 2,8-diazatricyclo(7.3.1.1)tetradecane; 1-azabicyclo(3.3.1)nonene, also known as 1-isogranatinine and the oxo, hydroxy and lower alkyl derivatives thereof; 1-azabicyclo(2.2.2)octane also known as quinuclidine as well as the halo, oxo, hydroxy and lower alkyl derivatives thereof; 1-azatricyclo(3.3.1.1)decane; 1,3-diazabicyclo(2.2.2)octane; 1,3-diazabicyclo(3.3.1)nonene; 1,6-diazatricyclo(5.3.1)dodecane; 2-ox-1-azabicyclo(2.2.2)octane; 4,6,10-triox-1-azatricyclo(3.3.1)decane; 1,5-diazabicyclo(3.3.1)nonene; 1,2,5,8-tetrazatricyclo(5.3.1.1)dodecane; 1,4-diazabicyclo(2.2.2)octane also known as triethylene diamine and its oxo, hydroxy, halo and lower alkyl derivatives thereof; 1,3-diazatricyclo(3.3.1.1)decane also known as 1,3-diazadamantane; 1,3,5-triazatricyclo(3.3.1)decane; 1,3,5,7-tetrazabicyclo( 3.3.1)nonene also known as pentamethylene tetramine; 1,3,5,7-tetrazatricyclo(3.3.1.1)-decane also known as hexamethylenetetramine; 2-oxa-1,3,4-triazabicyclo(3.3.1)nonene; 1-azabicyclo(4.3.1)decane; 1-azabicyclo(3.2.2)nonene; 1,5-diazabicyclo(3.2.2)nonene; 1,3,5,7-tetrazabicyclo(3.3.2)decane; 1,5-diazabicyclo(3.3.3)undecane, etc.

Of the aforementioned poly(heterocyclic) amines having a nitrogen in a bridgehead position the most common and widely known compound is 1,4-diazabicyclo(2.2.2)octane (triethylenediamine) and this material as well as its oxo, hydroxy, halo and lower alkyl derivatives comprises the preferred cocatalyst for use in my process.

The reaction is performed under liquid phase conditions and, when the olefin comprises a liquid at the reaction conditions, the olefin can be used in excess to provide the liquid reaction medium. If desired, however, any suitable nonpolar, organic liquid can be employed as a reaction solvent; preferably, organic solvents which are inert to the reaction conditions, the reactants, the catalyst and the products are employed. Examples of suitable solvents which can be used in accordance with my invention include hydrocarbons such as the aromatic, aliphatic or alicyclic hydrocarbons, ethers, esters, ketones, etc.

Examples of suitable hydrocarbons that can be employed in the solvents include aromatic hydrocarbons such as benzene, toluene, xylene, ethylbenzene, tetralin, etc.; aliphatic hydrocarbons such as butane, pentane, isopentane, hexane, isohexane, heptane, octane, isooctane, naphtha, gasoline, kerosene, mineral oil, etc.; alicyclic hydrocarbons, e.g., cyclopentane, cyclohexane, methylcyclopentane, decalin, indane, etc.

Various alkyl and aryl ketones can also be employed as the reaction solvent, e.g., acetone, methylethyl ketone, diethyl ketone, diisopropyl ketone, ethyl-n-butyl ketone, methyl-n-amyl ketone, cyclohexanone, diisobutyl ketone, etc.

Ethers can also be employed as the reaction solvent, e.g., diisopropyl ether, di-n-butyl ether, ethylene glycol diisobutyl ether, methyl o-tolyl ether, ethylene glycol dibutyl ether, diisoamyl ether, methyl p-tolyl ether, methyl m-tolyl ether, dichloroethyl ether, ethylene glycol diisoamyl ether, diethylene glycol diethyl ether, ethylbenzyl ether, diethylene glycol diethyl ether, diethylene glycol dimethyl ether, ethylene glycol dibutyl ether, ethylene glycol diphenyl ether, triethylene glycol diethyl ether, diethylene glycol di-n-hexyl ether, tetraethylene glycol dimethyl ether, tetraethylene glycol dibutyl ether, etc.

Various esters can also be employed as the solvent, e.g., ethyl formate, methyl acetate, ethyl acetate, n-propyl formate, isopropyl acetate, ethyl propionate, n-propyl acetate, sec-butyl acetate, isobutyl acetate, ethyl n-butyrate, n-butyl acetate, isoamyl acetate, n-amyl acetate, ethyl formate, ethylene glycol diacetate, glycol diformate, cyclohexyl acetate, furfuryl acetate, isoamyl n-butyrate, diethyl oxalate, isoamyl isovalerate, methyl benzoate, diethyl malenate, valerolactone, ethyl benzoate, methyl salicylate, n-propyl benzoate, n-dibutyl oxalate, n-butyl benzoate, diisoamyl phthalate, dimethyl phthalate, diethyl phthalate, benzyl benzoate, n-dibutyl phthalate, etc. A preferred class of ester solvents includes the lactones, e.g., butyralactone, valerolactone and their derivatives having lower ($C_1$–$C_5$) alkyl substituents.

Alcohols can also be employed as a reaction solvent. Preferably tertiary alcohols are employed since these materials are substantially non-reactive under the reaction conditions. Primary and secondary alcohols can be employed but are less preferred since these materials can react with aldehyde compounds under the reaction conditions to produce acetals. While in some instances these may be desired products, it is generally desirable to produce the carbonyl compound or alcohol directly without the formation of the acetal. It is of course apparent, if desired, that the acetal can be hydrolyzed to obtain the aldehyde. Examples of alcohols that can be employed as solvents include the aliphatic and alicyclic alcohols such as methanol, ethanol, isopropanol, butanol, t-butanol, t-amyl alcohol, hexanol, cyclohexanol, etc.

The hydroformylation reaction can be performed under relatively mild conditions including temperatures from 20° to 300°C., preferably from 50° to 250°C., and most preferably from 75° to 175°C. The pressure for the reaction should be sufficient to maintain the solvent in liquid phase under the reaction conditions and can be from 1 to about 10,000 atmospheres, preferably from 10 to about 100, and most preferably from 50 to about 300 atmospheres. The carbon monoxide and hydrogen can be introduced into the reactor in relative molal ratios from about 1 to 10, to about 10 to 1, parts of carbon monoxide per part of hydrogen. Preferably, the gas reactants are introduced in molal ratios of from about 3:1 to 1:3 and, most preferably, at about equal molal concentrations.

The reaction can be performed batchwise or in a continuous fashion. When operating batchwise, the catalyst, the reaction medium and the olefin can be introduced into the reaction zone and the reaction zone can then be pressured with the carbon monoxide and hydrogen in the aforedescribed manner and heated to the desired reaction temperature. The reaction can be continued with the initial charge of reactants until substantially completed as indicated by the achievement of a steady state reaction pressure or other suitable means. When the olefin is a gas under the reaction conditions, it can be introduced in a continuous fashion into the batch process by bubbling the gas into contact with the liquid reaction medium. Upon completion of the reaction or when the concentration of carbonylated products has reached an optimum in the liquid medium, the reaction can be discontinued and the products can be recovered from the reaction medium by conventional separation techniques such as fractional distillation.

When continuous processing is employed, the catalyst and reaction medium can be charged to the reaction zone initially and pressured with carbon monoxide and hydrogen and then heated to reaction temperature. It is preferred to initially pressure the catalyst with carbon monoxide to a pressure of at least 1 and, most preferably, at least 10 atmospheres before adding the hydrogen. Once the reaction is initiated, continuous and simultaneous addition of the gases can be practiced. The reactant olefin, carbon monoxide and hydrogen can then be introduced in a continuous fashion while removing an effluent containing the carbonylated products from the reaction zone. When the olefin is a gas at the reaction conditions, it can be bubbled into contact with the liquid reaction medium and will serve to strip the carbonylated products from the reaction zone in a vapor effluent. The vapor effluent can then be cooled to condense the carbonylated products and the noncondensible hydrocarbon olefin and carbon monoxide recycled to further contact in the reaction zone. The products can also be recovered from the reaction zone by continuously or intermittently withdrawing a portion of the liquid effluent from the reaction zone and distilling this reaction medium to recover the carbonylated products from the reaction solvent and the catalyst which was contained in the liquid effluent. The reaction solvent and catalyst can then be recycled to further contacting in the reaction zone.

The high boiling tars and byproducts of the reaction accumulate in the reaction medium and are concentrated in the residue remaining from the distillation of the reaction medium in the distillative recovery of the products. The bulk of the distillate residue comprises reaction solvent, catalyst and the accumulated high boiling byproducts and this residue is removed from the distillation zone and recycled to further contacting.

The residue is treated in accordance with my invention by removing from about 1 to about 25 percent of the residue and treating this removed residue to extract the catalyst values therefrom. Prior to extraction of the removed portion of the reaction residue, the residue can be further concentrated by distillation at subatmospheric pressures, e.g. distillation at a temperature from 90° to 225°C. and from 1 to 600 millimeters mercury pressure, preferably from 10 to about 250 millimeters mercury, to remove additional quantities of the reaction solvent which can be returned to the reaction zone. Other treatments that can be employed, particularly when the reaction medium also contains a heterocyclic, polycyclic bridgehead amine, comprise water washing of the reaction solvent prior to the extraction step to extract the basic amine from the reaction residue.

The reaction residue containing the catalyst metal values is treated in accordance with my invention with the aforementioned aqueous acid solutions. The amount of the acid solution which is admixed with the residue containing the metal values can be widely varied from about 0.005 volume parts to about 100 volume parts of the acid solution per part of residue. Preferably the amount employed is from about 0.01 to about 5 parts of acid solution per part of the residue and, most preferably, from about 0.1 to about 1 part acid solution per part of metal complex solution.

The extraction is performed at ambient temperatures and is effected by contacting the catalyst residue solution with the acid solution. This can be effected by batch or continuous mixing, e.g., by the introduction of the acid solution into the line through which the residue is withdrawn or by admixing in a separate vessel. The admixed phases are then permitted to clarify or settle so that the nonpolar phase can be separated and removed from the acid phase which can be further treated, if desired, to recover the metal and ligand values therefrom.

After the phases are separated, the catalyst and excess ligand, if present, can be recovered from the acid phase by dilution of the acid phase with water which precipitates the metal complex and excess ligand from the acid phase. Alternatively, the acid can be neutralized with a base, e.g., an alkali metal hydroxide such as sodium hydroxide or with ammonia to precipitate the catalyst complex therefrom. Since the acid solutions of the metal complex are colored, the amount of water or base to effect precipitation can simply be adjusted to that sufficient to effect decoloring of the acid phase. Generally the amount of water will be from 0.2 to about 10, preferably from about 0.5 to 5 volume parts water per volume part of acid solution while the amount of base required in the absence of any dilution will be that necessary to raise the acid pH to a value of about 1–2.

The dilution or neutralization of the aqueous acid phase is preferably performed in the presence of any of the aforementioned hydrocarbons or hydroformylation solvents which thereby extract the Group VIII metal complex from the aqueous phase into the solvent phase. This recovery is effected at temperatures similar to that used in the extraction, i.e., from about 0° to about 125°C. and sufficient pressure to maintain liquid phase conditions during the recovery step.

The solvent can be admixed with the aqueous acid solution in an amount from about 100 to about 0.1 volume parts per volume part of the aqueous acid solution; preferably from about 10 to about 50 volume parts per volume part of the aqueous acid solution so as to extract substantially all the Group VIII metal complex therefrom. This recovery step can likewise be performed continuously or batchwise by injecting the quantities of water to dilute the acid concentration or of base to neutralize the acid to the aforestated pH and the nonpolar solvent to extract the metal complex from the diluted or neutralized aqueous acid into contact with the aqueous extract. After admixing of these components, the admixture can be passed to a suitable vessel for clarification or settling of the phases and for separation of the solvent phase which contains the soluble metal ligand complex. Preferably the solvent employed is one that is compatible with the hydroformylation reaction conditions so that the resulting extract from the recovery step can be supplied directly to the reaction zone to maintain the inventory of catalyst therein.

EXAMPLE 1

An aminoarylphosphine was prepared by adding 2 grams of magnesium metal turnings and 16 grams of p-(N,N-dimethyl)bromo aniline to 100 milliliters tetrahydrofuran to form a Grignard reagent to which was added, at −78°C., 16 grams of diphenyl chlorophosphine. The mixture was warmed to room temperature and then refluxed one and one-half hours. To the resulting solution after cooling to room temperature were added 220 milliliters of 1.2N aqueous hydrochloric acid. The resultant solution was extracted several times with ethyl ether; the ether extract was then heated to remove the solvent, leaving the crude product.

The crude product was purified by dissolving in concentrated hydrochloric acid, extracting with ether. The phosphine was recovered as fine, white crystals with a melting point of 150°–152°C. by diluting the acid phase severalfold with water.

The aforeillustrated preparative technique can be used for the preparation of any of the amino- or amidino- ligands discussed herein simply by substitution of the aforementioned amino or amidino alkylene, cycloalkylene or arylene halide and any of the phosphine, arsine or stibine halides for those used in the illustrated mode of practice.

EXAMPLE 2

The N,N-dimethylaminophenyldiphenylphosphine prepared in the preceding example was used to prepare a catalyst for the hydroformylation of olefins. In the preparation of the catalyst, 0.5 gram of rhodium chloride, 40 grams of the N,N-disubstituted amino phosphine, 100 milliliters methanol and 10 milliliters of water were refluxed twenty minutes while maintained under a carbon monoxide atmosphere. A solution of 2.0 grams sodium borohydride in 50 milliliters of methanol was slowly added to the suspension, the resulting mixture was refluxed for an additional 15 minutes and 100 milliliters of water were then added. The suspension was cooled and filtered and the filtered solid was washed with water to recover 4.0 grams of the rhodium hydride carbonyl complexed with the amino phosphine.

EXAMPLE 3

The hydroformylation of propylene was performed by charging 1.0 gram of the catalyst, 4.0 grams of the N,N-dimethylaminophenyldiphenylphosphine, 500 milliliters toluene and 114 grams propylene to an autoclave equipped with an internal cooling coil and stirrer. The autoclave was closed and pressured to 300 psig with carbon monoxide and then an additional 300 psi with hydrogen. The contents were heated to 125°C. and a pressure drop of 180 psi was observed to occur within 4 minutes. The autoclave was cooled, depressured and the contents weighed to reveal a weight increase of 83 grams. The products were mixed normal and iso- butyraldehydes with a normal to iso ratio of 2.0.

EXAMPLE 4

The hydroformylation of Example 3 was repeated with the presence of 2.0 grams triethylenediamine [1,4-diazabicyclo-(2.2.2)octane] to yield a weight increase of 30 grams and a mixed normal and isobutyraldehyde product having a normal to iso ratio of 2.1.

EXAMPLE 5

The liquid residue remaining after distillation of the autoclave contents to recover the butyraldehydes in Example 4 was diluted with 500 milliliters toluene and extracted twice with 50 milliliter portions of 18N sulfuric acid. Analysis of the extract phases revealed that the extraction recovered 90 percent of the rhodium present in the residue.

The acid extract phases were combined and diluted with 6 volumes of water and then extracted twice with 250 milliliters of toluene. Analysis for rhodium in the extract and raffinate phases revealed that 90 percent of the rhodium had been recovered in the toluene.

The toluene extracts were combined and 2.0 grams of triethylenediamine were added. The resulting solution was charged to an autoclave with 102 grams propylene and the autoclave was closed, pressured to 300 psig with carbon monoxide and then an additional 300 psi with hydrogen. The autoclave was heated to 110°C. and a pressure drop of 170 psi was observed in a period of 20 minutes. The autoclave contents were weighed to reveal a 50 gram weight increase and the products were analyzed to reveal mixed normal and isobutyraldehydes with a normal to iso ratio of 1.8.

While the preferred mode of practice has been illustrated by use of the N,N-dimethylaminodiphenylphosphine and rhodium catalyst, any of the aforementioned ligands bearing from 1 to 3 basic nitrogen groups, i.e., amino or amidino groups, can be substituted for that illustrated on an equal molar basis. As an example of such substitution is the replacement in Example 3 of the rhodium catalyst with a mixture of 2 grams cobaltous chloride and 4 grams of amino-n-butyl-dibutylphosphine. The resultant hydroformylation can be practiced to obtain a crude product containing a high normal to branched chain structure from which the catalyst and ligand can be readily extracted using the procedure of Example 5.

Having described my invention and illustrated the preferred mode of practice thereof, I therefore claim:

1. The hydroformylation of olefins which comprises contacting under liquid phase conditions a hydrocarbon olefin having the following structure:

$$R_2R_1C=CR_3R_4$$

wherein:
R$_1$, R$_2$, R$_3$ and R$_4$ are hydrogen, alkyl of 1 to 17 carbons; cycloalkyl of 5 to 10 carbons; or aryl of 6 to 10 carbons; or wherein one of said R$_1$ and R$_2$ together with one of said R$_3$ and R$_4$ form a single alkylene of 2 to about 8 carbons;

with carbon monoxide and hydrogen in the presence of a catalyst comprising a complex of a Group VIII metal with a biphyllic ligand of the following structure:

$$ER_3$$

wherein:
E is trivalent arsenic, antimony or phosphorus;
R is the same or different alkyl or 1 to 10 carbons; cycloalkyl of 5 to 10 carbons or aryl of 6 to 10 carbons, and at least one of said R groups is aminoalkyl or amidinoalkyl of 1 to 10 carbons or aminoaryl or amidinoaryl of 6 to 10 carbons;

at a temperature from about 20° to 300°C. and a pressure from 1 to 10,000 atmospheres and for a sufficient time to form a crude reaction product containing a hydroformylated product having one more carbon than said olefin; removing a liquid effluent containing said crude product and catalyst complex from said contacting, distilling said effluent to recover said hydroformylated product from a residue containing said catalyst complex, and recovering said catalyst complex therefrom by contacting at least a portion of said residue with an aqueous acid selected from the class consisting of hydrohalic, sulfuric, nitric, phosphoric and $C_1$ to $C_9$ alkane and aryl sulfonic acids having a sufficient concentration to effect decoloring of a toluene solution of said metal complex and separating said aqueous acid from said portion of said residue.

2. The hydroformylation of claim 1 wherein said Group VIII metal is a noble metal.

3. The hydroformylation of claim 2 wherein said metal is rhodium and wherein at least one of said R groups of said ligand is aryl.

4. The hydroformylation of claim 2 wherein one of the R groups of said ligand is aminoaryl and the remainder are aryl.

5. The hydroformylation of claim 1 wherein said aqueous acid separated from said portion of said residue is admixed with an inert non-polar solvent selected from the class consisting of aryl, alkyl and cycloalkyl hydrocarbons, alkyl and aryl ketones and alkyl ethers and esters to form a two-phase mixture and then diluted with water in a sufficient quantity to effect decoloration of the aqueous acid phase and extraction of said catalyst complex into said non-polar acid phase.

6. The hydroformylation of claim 5 wherein said non-polar solvent containing said catalyst complex is returned to said olefin contacting step.

7. The hydroformylation of claim 1 wherein E is phosphorus.

8. The hydroformylation of claim 7 wherein at least one of said R groups is aryl and said metal is rhodium.

9. The hydroformylation of claim 8 wherein one of said R groups of the ligand is aminoaryl and the remainder are aryl.

10. The hydroformylation of claim 9 wherein said ligand is aminophenyl diphenylphosphine.

11. The hydroformylation of claim 1 wherein said olefin is an alpha hydrocarbon olefin.

12. The hydroformylation of claim 11 wherein said olefin has from 2 to about 8 carbons.

13. The hydroformylation of claim 1 wherein said catalyst is a rhodium carbonyl complex with aminophenyl diphenylphosphine.

* * * * *